(12) United States Patent
Ferguson (10) Patent No.: US 7,856,888 B2
(45) Date of Patent: Dec. 28, 2010

(54) FIBER OPTIC STRAIN GAGE AND CARRIER

(75) Inventor: Stephen K. Ferguson, Lawrenceville, GA (US)

(73) Assignee: Micron Optics Inc., Atlanta, GA (US)

( * ) Notice: Subject to any disclaimer, the term of this patent is extended or adjusted under 35 U.S.C. 154(b) by 0 days.

(21) Appl. No.: 11/940,994

(22) Filed: Nov. 15, 2007

(65) Prior Publication Data

US 2009/0126501 A1 May 21, 2009

(51) Int. Cl.
*G01L 1/24* (2006.01)
*G02B 6/00* (2006.01)

(52) U.S. Cl. .......................................... 73/800; 385/13
(58) Field of Classification Search .................. 73/800; 385/13
See application file for complete search history.

(56) References Cited

U.S. PATENT DOCUMENTS

| | | | |
|---|---|---|---|
| 4,357,072 | A | 11/1982 | Goodfellow et al. |
| 4,904,046 | A | 2/1990 | Paschke et al. |
| 4,918,305 | A | 4/1990 | Wlodarczyk et al. |
| 5,177,806 | A | 1/1993 | Abbott et al. |
| 5,337,387 | A | 8/1994 | Kramer et al. |
| 5,515,473 | A | 5/1996 | Yamauchi et al. |
| 5,566,671 | A * | 10/1996 | Lyons .......................... 600/391 |
| 5,658,364 | A | 8/1997 | DeVore et al. |
| 5,664,040 | A | 9/1997 | Kramer et al. |
| 5,745,626 | A | 4/1998 | Duck et al. |
| 5,812,251 | A * | 9/1998 | Manesh ........................ 356/32 |
| 5,896,191 | A * | 4/1999 | Beier et al. ................. 356/35.5 |

(Continued)

FOREIGN PATENT DOCUMENTS

JP          09211348 A   *   8/1997

OTHER PUBLICATIONS

"encapsulated." The American Heritage® Dictionary of the English Language, Fourth Edition. 2003. Houghton Mifflin Company Feb. 2, 2010 <http://www.thefreedictionary.com/encapsulated>.*

(Continued)

*Primary Examiner*—Lisa M Caputo
*Assistant Examiner*—Jonathan Dunlap
(74) *Attorney, Agent, or Firm*—Greenlee Sullivan P.C.

(57) ABSTRACT

The current invention relates to optical gages designed to measure strain on the surface of a test specimen. The gages of this invention is designed to be installed and used in a manner similar to conventional electronic foil strain gages, but to have the advantages of an all-optical gage. The gage of this invention is constructed to allow surface strain on the test specimen to be transferred to a length of optical fiber containing a fiber Bragg grating (FBG). As strain is applied to the fiber, the optical spectrum center wavelength reflected by the Bragg grating shifts in wavelength. This shift in wavelength can be converted directly to units of strain. The current invention provides a gage carrier design for use with fiber optic strain sensors comprising one or more FBGs which provide the benefits of a carrier for ease of handling and mounting without degrading gage performance. The gage carrier provides features that allow the FBG to be precisely positioned and securely bonded to the test specimen in a controlled manner. The carrier additionally provides fiber protection to the installed FBG.

28 Claims, 3 Drawing Sheets

U.S. PATENT DOCUMENTS

| | | | |
|---|---|---|---|
| 5,926,599 A * | 7/1999 | Bookbinder et al. ........ 385/137 |
| 6,115,122 A | 9/2000 | Bao et al. |
| 6,122,430 A * | 9/2000 | Bookbinder et al. ........ 385/137 |
| 6,125,216 A * | 9/2000 | Haran et al. .................. 73/800 |
| 6,317,555 B1 | 11/2001 | Maron et al. |
| 6,349,165 B1 * | 2/2002 | Lock .......................... 385/136 |
| 6,449,047 B1 | 9/2002 | Bao et al. |
| 6,490,931 B1 | 12/2002 | Fernaid et al. |
| 6,517,254 B1 * | 2/2003 | Hata et al. .................... 385/69 |
| 6,519,388 B1 * | 2/2003 | Fernald et al. ................ 385/37 |
| 6,668,105 B2 | 12/2003 | Chen et al. |
| 6,726,371 B2 | 4/2004 | Nishita |
| 6,768,825 B2 | 7/2004 | Maron et al. |
| 6,788,873 B2 | 9/2004 | Fritz et al. |
| 6,834,552 B1 * | 12/2004 | Thorsen ....................... 73/800 |
| 6,915,686 B2 | 7/2005 | Baustad |
| 6,960,028 B2 | 11/2005 | Lampert |
| 7,060,967 B2 | 6/2006 | Thingbo et al. |
| 7,063,466 B2 * | 6/2006 | Ferguson ..................... 385/78 |
| 7,068,869 B1 | 6/2006 | Araujo et al. |
| 7,134,219 B2 * | 11/2006 | Wood et al. ................... 33/613 |
| 7,137,299 B2 * | 11/2006 | Meyer .......................... 385/13 |
| 7,157,693 B2 | 1/2007 | Thingbo et al. |
| 7,379,632 B1 * | 5/2008 | Twerdochlib ................. 385/13 |
| 7,398,697 B2 * | 7/2008 | Allen et al. .................... 73/800 |
| 2004/0083808 A1 * | 5/2004 | Rambow et al. .............. 73/250 |
| 2004/0113306 A1 * | 6/2004 | Rapacki et al. .............. 264/102 |
| 2004/0114850 A1 * | 6/2004 | Dewyntermarty et al. ..... 385/13 |
| 2004/0223679 A1 | 11/2004 | Pickrell et al. |
| 2005/0042370 A1 * | 2/2005 | McManus et al. ........... 427/206 |
| 2005/0050962 A1 * | 3/2005 | Zerwekh et al. ............... 73/800 |
| 2005/0212675 A1 * | 9/2005 | Green ..................... 340/572.8 |
| 2006/0034559 A1 | 2/2006 | Vidal et al. |
| 2006/0103534 A1 * | 5/2006 | Arms et al. ............... 340/572.1 |
| 2006/0153490 A1 * | 7/2006 | Araujo et al. ................. 385/13 |
| 2006/0285813 A1 | 12/2006 | Ferguson |
| 2007/0056383 A1 * | 3/2007 | Deeg ........................... 73/788 |
| 2007/0090996 A1 * | 4/2007 | Wang ........................ 342/463 |
| 2007/0175628 A1 * | 8/2007 | Pearson ..................... 166/93.1 |
| 2007/0193362 A1 | 8/2007 | Ferguson |
| 2007/0236346 A1 * | 10/2007 | Helal et al. ............. 340/539.22 |

OTHER PUBLICATIONS

"enclosed." The American Heritage® Dictionary of the English Language, Fourth Edition. 2003. Houghton Mifflin Company Feb. 2, 2010 <http://www.thefreedictionary.com/enclosed>.*

Meltz, G. (1996) "Overview of Fiber Grating-Based Sensors," *Proc. SPIE* 2838:2-22.

Morey et al. (1989) "Fiber Optic Bragg Grating Sensors," *Proc. SPIE* 1169:98-107.

Morey, W.W. (1996) "Recent Advances in Fiber Grafting Sensors for Utility Industry Applications," *Proc. SPIE* 2594:90-98.

Patrick et al. (1996) "Hybrid Fiber Bragg Grating/Long Period Fiber Grating Sensor for Strain/Temperature Discrimination," *Photonics Technology Letters IEEE* 8(9):1223-1225.

Vengsarkar et al. (1996) "Long-Period Fiber Bragg Gratings as Band-Rejection Filters," *J. Lightwave Technol.* 14(1):58-65.

* cited by examiner

FIBER OPTIC STRAIN GAGE AND CARRIER

BACKGROUND OF THE INVENTION

In the past few years, fiber optic-based strain gages have gained acceptance in the market as an alternative to conventional electronic gages which are based, for example, on changes in electrical resistance, inductance or capacitance. In many applications, such as civil structure monitoring, downhole oil and gas applications, as well as marine, and aerospace applications, fiber optic gages offer several advantages over conventional gages. Unlike electronic gages, fiber-based gages are not sensitive to electromagnetic interference and are well suited for use in electrically-noisy environments. Fiber-based gages are also readily multiplexed, allowing many gages to operate on a single fiber over long distances. Fiber-based gages can be made very small and lightweight for use in confined spaces. Fiber-based gages can also be made to withstand high temperature and corrosive environments.

A wide variety of optical gages are available that utilize various optical properties to measure a physical property of interest. These gages are designed to respond to the physical property to be measured by a change in amplitude, phase, polarization state, or other optical property of light transmitted through the fiber. Depending on the gage design, one or more of these optical properties can be monitored by an interrogation unit and converted to the physical property of interest.

The current invention relates to optical gages designed to measure strain at the surface of a test specimen. The gages of this invention are designed to be installed and used in a manner similar to conventional electronic foil strain gages, but to have the advantages of an all-optical gage. Gages of this invention are constructed to allow surface strain on the test specimen to be transferred to a length of optical fiber containing a Bragg grating. As strain is applied to the fiber, the optical spectrum center wavelength reflected by the Bragg grating shifts in wavelength. This shift in wavelength can be converted directly to units of strain.

In this type of gage, the fiber is often mounted to a carrier for ease of mounting onto the test specimen and ease of handling. The gage carrier can be made of a plastic film or thin metal shim. Plastic films work well in applications where the gage is applied to the test specimen with epoxy or other adhesives. Metal carriers are commonly used in applications where the gage is spot welded to the test specimen. Strain gages mounted on metal carriers are versatile because they can be installed quickly on various test specimens. Although the use of a carrier for such gages significantly improves handling and mounting, its use can also degrade gage performance. The gage carrier is positioned between the test specimen and the sensing element, requiring that strain from the test specimen is passed through the carrier to the fiber. This can result in a loss of sensitivity. Further, the gage carrier must be carefully mounted, so that strain is passed through the carrier fully and uniformly without deforming the carrier. Distortion of the carrier other than by pure linear strain can result in loss of accuracy of measurement because the sensing element is not exposed to the true strain present in the test specimen. Additionally, the stiffness of the carrier material itself can influence the strain measurement by reinforcing the stiffness of the test specimen. This occurs in electronic foil strain gages as well as fiber based optical gages.

U.S. Pat. No. 6,834,552 relates to a fiber-optical strain-gauge in which strain conveyed from a test specimen changes the distance between two fiber ends which in turn results in a change in transmission of light between the two fiber ends. The optical fiber ends are held aligned in a carrier. The carrier construction is described as providing a strain-dependent, relative movement of the optical fiber ends in a direction substantially perpendicular to the axial direction of the optical fibers so that a change in transmission of light between the fiber ends is a measure of the strain applied to the carrier from the test specimen. A carrier is described as having two fiber holding elements in which the two fiber ends are held aligned with a gap established between the ends, two fixation zones for attaching to the test specimen, and two double-hinge zones which convert axial relative movement of the fixation zones into oppositely directed vertical movements of the holding elements and the fiber ends held in the holding elements. Additionally, a carrier is described in which the two double-hinge zones convert axial relative movements of the fixation zones into oppositely horizontal movements of the holding elements.

U.S. Pat. No. 7,068,869 relates to a passive athermal fiber Bragg grating (FBG) strain gage in which the carrier or package of the fiber Bragg grating is constructed to cancel temperature sensitivity of the gage. The strain gage is described as having a frame and pointer with a fiber-to-frame engagement means and a fiber-to-pointer engagement means, and means for attaching the frame to a structure to be monitored. The pointer is an element having threads which is threaded through an aperture in the frame so that the length of the pointer extending into the frame can be adjusted which in turn allows the length of the fiber segment between attachment points on the frame to be adjusted. The frame is described as having "flexures" which "allow strain at minimum stress to be applied to the FBG."

U.S. Pat. No. 7,134,219 relates to a fiber optic gap gauge which employs a Fabry-Perot interferometer (FPI) strain sensor. The gauge is described as having a base with an elongated tension bar, a pair of end connectors adjacent opposite ends of the tension bar and at least one spring connecting each end of the tension bar to a corresponding end connector. The tension bar is provided with a hollow cavity and slotted grooves so that the strain sensor can be introduced to measure strain in the base and particularly in the hollow cavity of the base. A bow spring having a pair of ends is described as being connected through its ends to corresponding end connectors of the base with middle section of the bow spring bowed away from the base to define a gap between the middle of the bow spring and the base. Application of a force to the middle of the bow spring decreases the gap and exerts a tensile force axially on the base. Strain is measured using the (FPI) strain sensor and strain is indicative of the change in the gap. The strain sensor does not contain a fiber Bragg grating and the optical fiber conveys light between the strain sensor and an external Fabry-Perot cavity where light is modulated.

Published U.S. patent application 2007/0193362, which is commonly owned with the present application, relates to a gage carrier design for use with fiber optic strain sensors comprising one or more FBGs which provides the benefits of a carrier for ease of handling and mounting without degrading gage performance. The carrier is made of any appropriate material including metal, ceramic or plastic. The gage carrier is selectively compliant along the axis of strain measurement. The carrier provides very little resistance to strain along the axis of measurement; therefore, the test specimen does not have to work against the stiffness of the metal gage carrier. More specifically, the gage carrier comprises a support bar extending along a longitudinal axis of the carrier, with first and second mounting surfaces positioned and rigidly attached at an end of the support bar for mounting the strain gage onto a surface of a test specimen. The gage carrier also has fastening elements for securing an optical fiber parallel to the longitudinal axis of the carrier. At least a portion of the support bar is elastic with respect to expansion, compression or both along the longitudinal axis of the carrier.

While a number of strain gage configurations are available in the art there remains a need for fiber optic strain gages which are easy to handle and rapidly installed without any significant loss of performance.

SUMMARY OF THE INVENTION

The present invention provides a fiber optic strain gage having the benefits of a pre-mounted strain gage without undesirable loss of gage performance. The gage is quickly and easily attached to a test specimen. The gage comprise a carrier having a passageway for receiving a continuous length of optical fiber containing a fiber Bragg grating (FBG) and means for fastening the carrier to the test specimen. The carrier is made of a flexible plastic that can be attached to the test specimen, for example using adhesive. The gage carrier is compliant and provides very little resistance to strain along the axis of measurement; therefore, the test specimen does not have to work against the stiffness of the carrier.

The gage carrier comprises a body having a passageway extending along its length for receiving an optical fiber containing one or more FGBs. A mold cavity is formed in a central portion of the body intersecting at least a portion of said passageway. The mold cavity receives a fiber bonding material for bonding the optical fiber to the holder and its carrier. The mold cavity is positioned in the body with respect to the passageway and an optical fiber inserted into the passageway such that fiber bonding material inserted into the mold cavity forms a bond between the fiber and the test specimen. In a specific embodiment, at least a portion of the passageway forms a fiber guide to position the fiber centrally with the mold cavity.

The carrier body further comprises a filling hole passing from the outside surface of the carrier into the mold cavity for introduction of fiber bonding material into the mold cavity and one or more vent holes passing from the outside surface of the carrier into the mold cavity and spaced apart from said filling hole to allow air to escape the mold cavity as fiber bonding material is introduced into the mold cavity.

An optical fiber containing one or more fiber FBGs is the active strain sensing transducer in the gages herein. The gage carrier serves several important purposes in facilitating the use of an optical FBG as a strain gage. The gage carrier serves as a fiber holding fixture providing a packaged device that is easily handled. The gage carrier provides protection to the fiber during installation and while it is in use. The gage carrier also provides features that allow quick and reliable attachment to the test specimen. An additional aspect of this invention is a FBG strain gage exhibiting the accuracy and sensitivity of gages that are not pre-mounted to a carrier, while providing the convenience of a pre-mounted gage.

Strain gage carriers of the present invention are readily attached to a test specimen for example, using adhesives, such as provided by a pre-applied transfer tape. The optical fiber carrying the one or more FBGs is then intimately bonded to the test specimen by introducing a fiber bonding material, for example, epoxy, into the mold cavity. The mold cavity in the carrier acts as a mold to contain and form fiber bonding material around the fiber and bonding the fiber to the test specimen. The carrier has a hole located over the center of the FBG for epoxy injection. The hole acts as a mold sprue creating a path for the epoxy to flow through. Additional holes are located near the ends of the carrier that act as vents to allow trapped air to escape as the epoxy fills the cavity in the carrier. In a specific embodiment, the adhesive is provided as a transfer tape and is protected during handling with a protective backing. During installation of such a sensor gage, the tape backing is pealed off and the sensor gage carrier is pressed into place on the test specimen. After the gage carrier is in the desired position, bonding material, such as an epoxy, is introduced into the mold cavity which on curing forms the desired bond of the fiber to the test specimen. The carrier can optionally be removed after the desired bond of the fiber to the test specimen has been formed.

Fiber optic strain gages attached with bonding materials, such as adhesives, perform well in many applications when proper surface preparation, cleaning, and adhesive curing procedures are followed.

The invention provides strain measuring systems comprising one or more of the gages of this invention in combination with a light source for coupling light of an appropriate range of wavelengths into the optical fiber of the gage and in combination with a detector for monitoring light reflected from the fiber Bragg grating in the fiber and/or for monitoring light passing through the fiber Bragg grating (e.g., a notch spectrum). In sensing systems, gages of this invention can be optically coupled in series or in parallel with appropriate provision of light from a light source and appropriate monitoring of light reflected by or transmitted by the fiber Bragg grating.

The invention also provides various measuring devices and systems which incorporate one or more fiber optic strain gages of this invention. These devices include temperature and pressure measurement gages, accelerometers, and displacement sensors, among others.

The invention additionally provides methods for measuring strain in a test specimen employing one or more strain gages of this invention. In this method, the strain gage is mounted on a test specimen in a desired location. In a specific embodiment, the gage is mounted on the test specimen such that the longitudinal axis of the gage is aligned with the axis of the test specimen in which strain is to be measured. Light of appropriate wavelength is coupled into the optical fiber of the strain gage and light reflected by the fiber Bragg grating of the optical fiber is detected. Detection can be performed by detecting reflected light or indirectly by detecting light transmitted though the fiber Bragg grating (detecting the notch resulting from reflection by the fiber Bragg grating). Changes in the wavelength reflected by the fiber Bragg grating are related to strain in the gage and in the test specimen.

The invention further provided kits for installation of a strain gage of this invention. The kits of the invention comprise a gage carrier of this invention with optical fiber containing at least one FBG in position in the gage, and appropriate bonding material. In specific embodiments, the bonding material is solder and in other embodiments the bonding material is an adhesive, such as an epoxy and in preferred embodiments the epoxy is a 100% solids epoxy. In the kit, when an adhesive is provided, a pre-determined amount of the adhesive sufficient for filling the mold cavity of the accompanying gage is provided in an appropriate container. For example, epoxy or other adhesive may be provided in a syringe, flexible tube or other contain that facilitates introduction of the adhesive into the mold cavity of the gage carrier. The kit optionally includes instructions installation of the strain gage and/or surface preparation and also may include one or more cleaning or other surface preparation agents. The kit may further optionally include one or more tools for surface preparation, for injection of the bonding material into the mold or to facilitate installation of the gage.

DETAILED DESCRIPTION OF THE INVENTION

The invention is further described by reference to the Drawings where like features are referenced by the same numbers.

FIGS. 1-4 illustrate an exemplary embodiment of a carrier mounted FBG strain gage of the present invention. The exemplary gage consists of a gage carrier 1 which holds and supports an optical fiber 2 containing a fiber Bragg grating (12) prior to installation. Optional, buffer tubes 3 protect fiber extending from the ends of the carrier during installation and use. A means for fastening the carrier to a test specimen is provided on surface 8. This fastening means can be selected to allow selective removal of the carrier to allow for repositioning of the carrier during installation or for optional removal of the carrier after bonding of the fiber. The carrier may be attached to the test specimen using epoxy, adhesives, clamps, screws or other fastening techniques. In a preferred embodiment, the carrier is attached to the test specimen using an adhesive transfer tape. This tape is preferably pre-applied during manufacture with a protective backing in place. In use, the installer need only remove the protective backing and press the gage in place.

Figure 4:
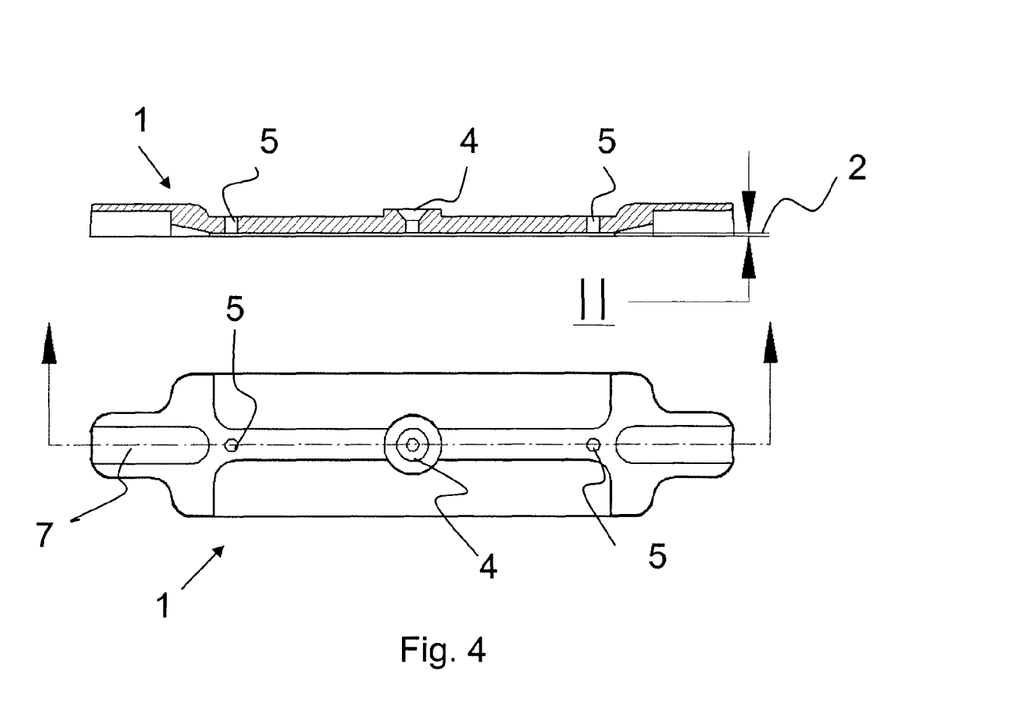
FIG. 4 is a section view of the gage carrier showing the channel where the fiber is located.

The gage carrier also provides physical protection to the fiber and optionally provides a feature for attaching protective buffer tubing 3. A recessed pocket 7 conforming to the shape of the buffer tubing is illustrated in FIG. 4 for attachment of protective buffer tubing. However, the buffer tubing can be fastened to the carrier using several techniques. The buffer tubing can be press fit, clamped, or thermally welded to the carrier. In a preferred embodiment, the buffer tubing is attached to the carrier using and epoxy, cyanoacrylate, or other adhesive.

The gage carrier 1 can be made of a variety of materials, including among others, plastic, rubber, thermoset resins, metal, glass, or ceramic. In practice thermoplastic elastomers have been found to function well. Thermoplastic elastomers are available in a wide range of durometers. In many applications it is desirable for the gage carrier to be somewhat elastic. This allows the gage to easily conform to curved test specimen surfaces.

The optical fiber 2 contains a Bragg Grating (12) which is positioned along the length of the fiber near the center of carrier 1 during assembly. The fiber is forced to the center of the gage carrier by the narrow section 9 located at each end of the carrier. This narrow section of the passageway serves as a fiber guide to position the fiber centrally within the mold cavity. This fiber guide in the passageway is preferably located along the passageway axis to position the fiber in the center of the mold cavity. In this specific embodiment, the fiber is held in position by sizing the narrow section smaller than the fiber diameter and forcing the fiber into the channel. The narrowed portion of the passageway (the fiber guide) is sufficiently long to provide for positioning the fiber. A fiber guide can be provided on one or both sides of the mold cavity. The fiber may also be held in place in the carrier using epoxy or other adhesive placed on the fiber in the narrow section. In an alternate embodiment the fiber can be molded in place as part of an insert molding operation. The fiber is held in tension during gage construction to maintain fiber straightness and prevent the fiber from touching sidewalls of cavity 6.

Figure 1:
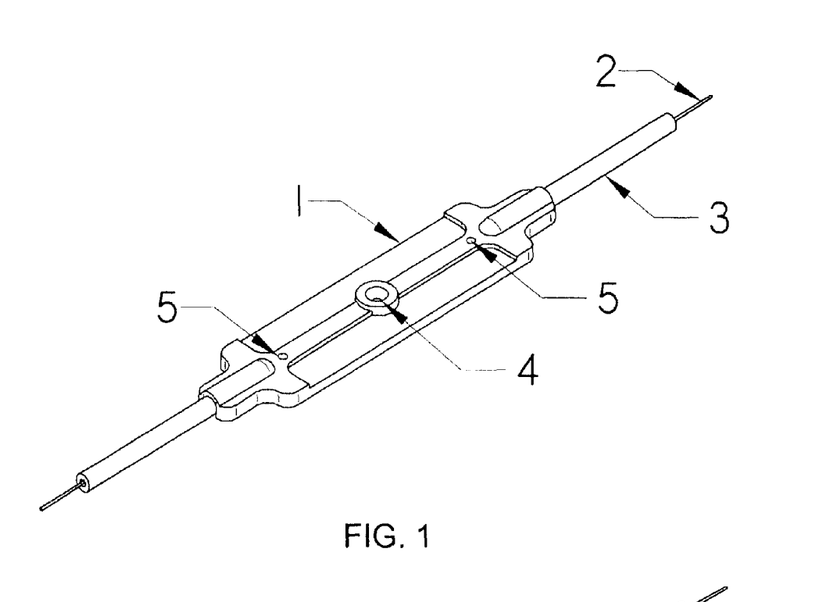
FIG. 1 is a schematic drawing illustrating the top surface of an exemplary fiber Bragg grating strain gage.
Figure 2:
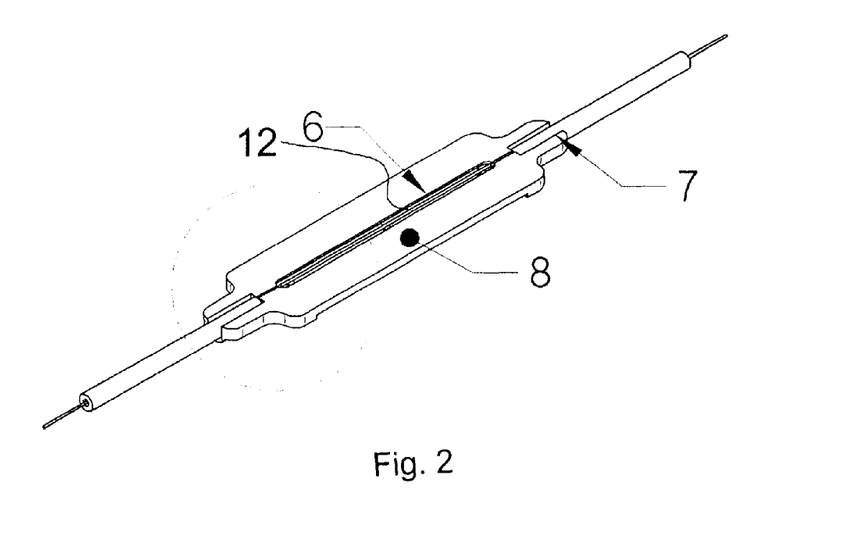
FIG. 2 is a bottom view of the strain gage illustrated in FIG. 1. This view shows the surface of the gage that will be in contact with the test specimen.

FIG. 2 illustrates the recessed cavity area 6 that functions as a mold cavity to contain and form bonding material injected during the installation process. The gage of FIG. 2 is specifically adapted for use of a flowable adhesive such as an epoxy. The cavity has a depth 11 nearly equal to the fiber diameter; therefore, the carrier when attached to a test specimen functions as a clamp holding the fiber firmly in place against the test specimen during installation. The width 10 of cavity 6 is sufficiently wide to prevent the fiber from touching the side walls. Sizing the cavity as noted ensures that the fiber is fully encapsulated when epoxy is injected into cavity. It has been found that a cavity width of 4 to 6 times the fiber diameter provides for good gage installation and performance.

Figure 3:
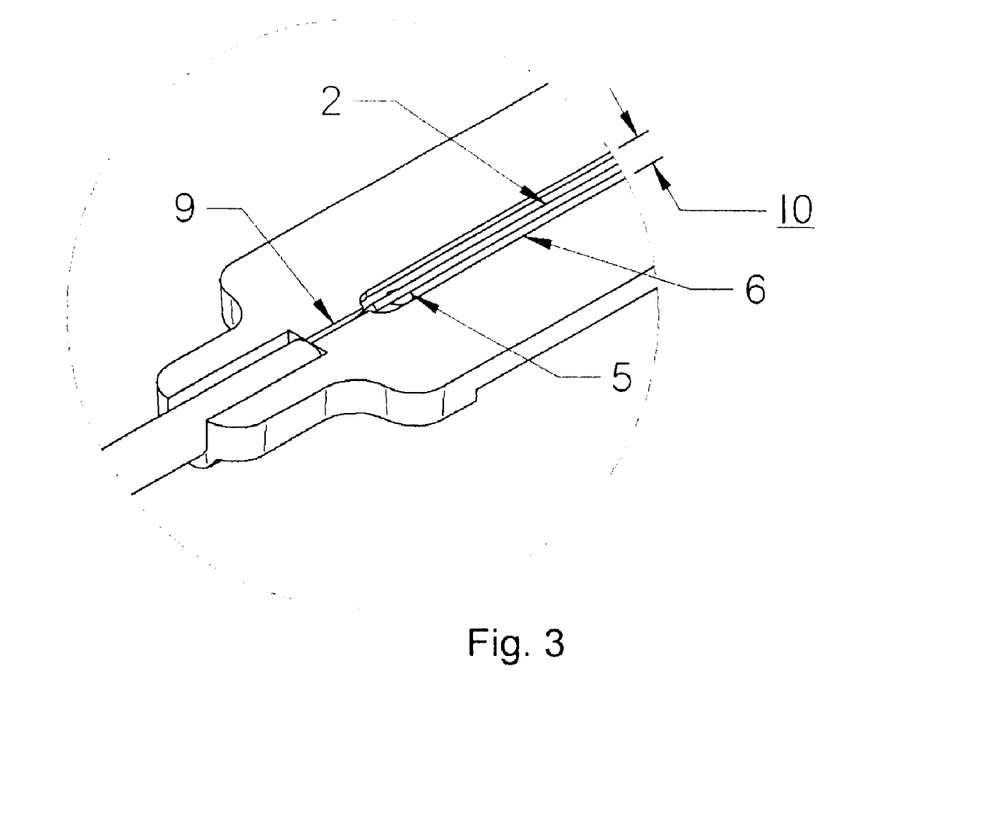
FIG. 3 is a close up view of a portion of FIG. 2.

FIG. 3 shows the fiber 2 centered in recessed cavity area 6. Also visible is vent hole 5. As noted above, it has been found that epoxy, particularly 100% solids epoxy, performs well to bond the fiber to many test specimens. Different epoxy formulations are available to address special test conditions such as high or low temperature. Other adhesives such as cyanoacrylate, acrylic, urethane, and hot melts may also be used in some applications. Solder made of various alloys may also be useful.

In practice, the surface of test specimen is prepared to provide a clean smooth mounting surface. This may require grinding or sanding to remove dirt, paint or oxide. Once the surface is smooth, it should be cleaned with compatible solvent to remove any oil or other contaminants. The gage of the present invention is then mounted to the test specimen, for example, using the pre-applied transfer tape on surface 8. In this case, the gage is pressed firmly in place with the transfer adhesive providing adhesion between surface 8 and the surface of the test specimen. Epoxy or other adhesive is injected into hole 4 using a syringe or other delivery device until it appears at both vent holes 5. When attached to the test specimen, the gage carrier 1 functions much like an injection mold. Hole 4 functions as a mold sprue guiding the epoxy into the cavity area 6. Air is forced out of the cavity through vent holes 5. Epoxy completely fills cavity 6 encapsulating FBG 2 in epoxy and securely bonding fiber to test specimen.

Once the epoxy has cured, the gage of the present invention can be used to measure strain at the surface of the test specimen. As stress is applied to the test specimen, surface strain in test specimen will be transferred to the optical fiber 2 containing a FBG. As strain is applied to the fiber, the optical spectrum center wavelength reflected by the Bragg grating shifts in wavelength. This shift in wavelength can be converted directly to units of strain.

In an alternative embodiment the gage carrier is used only as in installation aid and is removed after the bonding material has been introduced into the mold cavity and cured or otherwise solidified to form a bond. In this design the carrier simplifies fiber handling and provides fiber protection during installation. The carrier still provides all of the installation benefits described above. Once the installation is complete, the gage carrier is carefully lifted off the surface of the test specimen leaving the fiber and molded bonding material permanently attached to the test specimen. In this embodiment, it is helpful for the gage carrier to be made of a material that does not bond well with the bonding material (e.g., epoxy or other adhesive) used for installation. This will aid in removal of the carrier. Depending on the application, the buffer tubing may remain in place on the fiber or can also be removed. A configuration in which the buffer tubing is removed may be desirable when the installed gage must be as small as possible. This configuration may also be desirable when the gage will be covered by additional material such as carbon fiber or fiber glass.

In order to make sensors easier to use, a new standard IEEE 1451.4 has been developed to add plug and play functionality to sensors. The key to this standard is a standardization of a Transducer Electronic Data Sheet (TEDS). The TEDS contains all the information needed process the signal from the sensor. In the case of an optical strain gage, the TEDS may contain conversion constants to convert from wavelength to microstrain as well as other calibration constants. This information is commonly stored in a small EEPROM which can be molded into the gage carrier during manufacture. The instrument (e.g., sensor detector system) used to read the gage could retrieve the TEDS information using a radio frequency identification (RFID) tag. The RFID tags contain an integrated circuit for storing and processing information, modulating and demodulating a (RF) signal and an antenna for receiving and transmitting the signal.

The sensor gages of this invention can be employed in any currently art-known sensor interrogation or detection system useful for fiber optic sensors containing FBG as sensor components. Sensor interrogation systems include those as described in U.S. Pat. Nos. 6,115,122; 6,4449,047, 7,060, 967; and 7,157,693. the sensor gages herein are particularly useful with swept wavelength sensor interrogator systems and more particularly with swept wavelength interrogator systems having a tunable fiber laser light source.

The invention further provides optical fiber-based sensing systems comprising one or more of the strain gages of this invention as described herein. Such systems can comprise a plurality of strain gages which are configured in a serial configuration in which a contiguous or spliced optical fiber containing multiple fiber Bragg gratings extends between multiple gages (where there is at least one fiber Bragg grating for each strain gage in the configuration). The system may alternatively or in combination contain a plurality of gages in a parallel configuration in which the optical fibers of the gages are not optically connected to each other. In any such system, one or more appropriate light sources and one or more appropriate light detectors are provided. Various light sources and light detection systems are known in the art which can be applied in applications of the gages herein. In general, the optical fiber strain gages herein can be employed in any known fiber optic strain gage system that is known in the art in which fiber Bragg gratings are employed. In a specific embodiment, a plurality of the strain gages of this invention can be employed as components in multi-axis strain gages containing at least one gage for each test specimen axis for which strain is to be measured. In these systems, the longitudinal axis of a gage is aligned with an axis of the test specimen for which strain is to be measured.

The strain gages and carriers of this invention can further be employed as components in devices for measurement of displacement, force, pressure, temperature or acceleration. The use of strain gages in such measurement systems is known in the art and the gages herein can be applied in such systems as is known and understood in the art. In such measurement devices, the strain gage is attached to a material or object that is strained in response to the property to be measured. The property to be measured induces a strain in the responsive material or object which is then measured by the strain gage. In preferred situations the responsive material or object responds in a predictable, repeatable way when exposed to the property to be measured and ideally the response is linear. In specific embodiments, the responsive material or object is a displacement transducer (to measure displacement or a change in distance), a mass that can be accelerated (to measure acceleration), a load cell to which force can be applied (to measure force), a diaphragm that is responsive to pressure (to measure pressure) or a material or object which expands or contracts with temperature (to measure temperature).

When a Markush group or other grouping is used herein, all individual members of the group and all combinations and possible sub combinations of the group are intended to be individually included in the disclosure. Every combination of components described or exemplified herein can be used to practice the invention, unless otherwise stated. One of ordinary skill in the art will appreciate that methods, device elements, and materials other than those specifically exemplified can be employed in the practice of the invention without resort to undue experimentation. All art-known functional equivalents, of any such methods, device elements, and materials are intended to be included in this invention. Whenever a range is given in the specification, for example, a temperature range, a frequency range, a time range, or a composition range, all intermediate ranges and all sub-ranges, as well as, all individual values included in the ranges given are intended to be included in the disclosure. Any one or more individual members of a range or group disclosed herein can be excluded from a claim of this invention. The invention illustratively described herein suitably may be practiced in the absence of any element or elements, limitation or limitations which is not specifically disclosed herein.

As used herein, "comprising" is synonymous with "including," "containing," or "characterized by," and is inclusive or open-ended and does not exclude additional, un-recited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is intended to encompass within its scope the alternate embodiments employing "consisting essentially of" and "consisting of" the components or elements specifically recited.

Although the description herein contains many specificities, these should not be construed as limiting the scope of the invention, but as merely providing illustrations of some of the embodiments of the invention. Each reference cited herein is hereby incorporated by reference in its entirety. However, if any inconsistency arises between a cited reference and the present disclosure, the present disclosure takes precedent. Some references provided herein are incorporated by reference to provide details concerning the state of the art prior to the filing of this application, other references may be cited to provide additional or alternative device elements, additional or alternative materials, additional or alternative methods of analysis or application of the invention. All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art.

One of ordinary skill in the art will appreciate that device elements, as well as materials, shapes and dimensions of device elements, as well as methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention.

Reference in the specification to "a preferred embodiment," "an alternative embodiment" or "an exemplary embodiment" means that a particular feature, structure, or characteristic set forth or described in connection with the embodiment is included in at least one embodiment of the invention. Reference to "a preferred embodiment," "an alternative embodiment" or "an exemplary embodiment" in various places in the specification do not necessarily refer to the same embodiment.

We claim:

1. A gage carrier for a fiber optic strain gage comprising:
a body having a passageway extending along its length for receiving an optical fiber containing one or more fiber Bragg gratings, the passageway having a longitudinal axis, a central portion of the body intersecting at least a portion of the passageway forming a mold cavity for receiving a fiber bonding material, and a fiber guide formed along the longitudinal axis of the passageway for receiving the optical fiber, the mold cavity positioned in the body, with respect to the passageway and the fiber guide, and the optical fiber inserted into the passageway and the fiber guide, such that the optical fiber is in the mold cavity, does not touch the sidewalls of the mold cavity and is positioned against the test specimen when the optical fiber is inserted in the passageway and the fiber guide and the gage carrier is positioned on the test specimen prior to injection of the fiber bonding material;
a filling hole passing from the outside surface of the carrier into the mold cavity for introduction of fiber bonding material into the mold cavity and one or more vent holes passing from the outside surface of the carrier into the mold cavity and spaced apart from said filling hole to allow air to escape the mold cavity as fiber bonding material is introduced into the mold cavity; and
a mounting surface for attaching the carrier to a test specimen,
wherein the mold cavity has a depth and width such that on injection of fiber bonding material to completely fill the mold cavity after insertion of the optical fiber into the passageway and fiber guide and positioning of the gage on the test specimen, the inserted fiber bonding material bonds the optical fiber to the test specimen.

2. The gage carrier of claim 1 further comprising one or two fastening points for attachment of fiber protection buffer tubing.

3. The gage carrier of claim 1 wherein the carrier is fabricated from an elastomeric material, a thermoplastic material or a thermoset material.

4. The gage carrier of claim 1 wherein the carrier is fabricated from metal, glass, or ceramic.

5. The gage carrier of any one of claim 1, 2, 3 or 4 further comprising a Transducer Electronic Data Sheet (TEDS) implemented by adding an EEPROM or other electronic memory device during manufacture.

6. The gage carrier of any one of claim 1, 2, 3 or 4 further comprising a Radio Frequency Identification (RFID) inlay molded in during manufacture or added after manufacture.

7. The gage carrier of any one of claim 1, 2, 3 or 4 further comprising a virtual Transducer Electronic Data Sheet (TEDS) implemented by adding a unique machine readable identifier.

8. A fiber optical strain gage for measurement of strain in a test specimen comprising:
an optical fiber containing one or more fiber Bragg gratings and a gage carrier of claim 1 wherein the optical fiber is inserted into the passageway and the fiber guide and passes through the mold cavity such that at least one of the one or more fiber Bragg gratings is in the length of fiber within the mold cavity.

9. The strain gage of claim 8 further comprising a single fiber connection or a double ended fiber connection extending from the gage.

10. The strain gage of claim 8 further comprising a strain relief element to protect the optical fiber on entrance, exit or both from the gage carrier.

11. A strain gage kit comprising a strain gage of any one of claim 8, 9 or 10 and a fiber bonding material for introduction into the mold cavity of the strain gage.

12. A strain gage kit comprising a strain gage of any one of claim 8, 9 or 10, epoxy adhesive, and a syringe with applicator tip.

13. An optical fiber sensing system comprising one or more of the strain gages of any one of claim 8, 9 or 10.

14. An optical fiber sensing system comprising one or more of the strain gages of any one of claim 8, 9 or 10 and a displacement transducer.

15. A device for measurement of displacement which comprises a strain gage of any one of claim 8, 9 or 10.

16. A device for measuring force comprising the strain gage of any one of claim 8, 9 or 10 and a load cell responsive to the force to be measured wherein the strain gage is attached to the load cell.

17. A device for measuring pressure comprising the strain gage of any one of claim 8, 9 or 10 and a diaphragm that is responsive to the pressure to be measured wherein the strain gage is attached to the diaphragm.

18. An accelerometer comprising a strain gage of any one of claim 8, 9 or 10 and a mass which is responsive to the acceleration to be measured, wherein the strain gage is attached to the mass.

19. A temperature measurement device which comprises a strain gage of any one of claim 8, 9 or 10.

20. A fiber optical strain gage for measurement of strain in a test specimen comprising:
an optical fiber containing one or more fiber Bragg gratings and a gage carrier of any one of claim 2, 3 or 4 wherein the optical fiber is inserted into the passageway and fiber guide and passes through the mold cavity such that at least one of the one or more fiber Bragg gratings is in the length of fiber within the mold cavity.

21. A fiber optical strain gage for measurement of strain in a test specimen comprising:
an optical fiber containing one or more fiber Bragg gratings and a gage carrier of any one of claim 1, 2, 3 or 4, wherein the optical fiber is inserted into the passageway and fiber guide and passes through the mold cavity such that at least one of the one or more fiber Bragg gratings is in the length of fiber within the mold cavity and wherein the gage carrier further comprises a Transducer Electronic Data Sheet (TEDS) implemented by adding an EEPROM or other electronic memory device to the carrier during manufacture, virtual Transducer Electronic Data Sheet (TEDS) or a Radio Frequency Identification (RFID) inlay molded into the gage carrier during manufacture or added after manufacture.

22. A method for attaching one or more strain gages comprising an optical fiber containing one or more fiber Bragg gratings and a gage carrier to a test specimen which comprises the steps of:
(a) attaching one or more gage carriers of claim 1 to the test specimen wherein the optical fiber of the one or more gage carriers contains one or more fiber Bragg gratings such that at least one of the one or more fiber Bragg gratings is in the length of fiber within the mold cavity of the one or more gage carriers;
(b) injecting a fiber bonding material into the mold cavity of the one or more gage carriers through the filling hole of the one or more gage carriers to fill the mold cavity with the fiber bonding material to bond the optical fiber to the test specimen.

23. The method of claim 22 wherein the one or more gage carriers further comprise a pre-applied adhesive on the mounting surface for attachment of the one or more gape carriers to the test specimen.

24. The method of claim 22 further comprising the step of removing the one or more gage carriers of the one or more strain gages from the test specimen after the optical fiber containing the one or more fiber Bragg gratings is bonded to the test specimen, the one or more strain gages remaining bonded to the test specimen after the carrier is removed.

25. The method of claim 24 wherein the one or more gage carriers further comprise a pre-applied adhesive on the mounting surface for removable attachment of the carrier to the test specimen.

26. A method for measuring strain in a test specimen which comprises the steps of:
(a) attaching one or more strain gages to the test specimen by the method of claim 22;
(b) introducing light of appropriate wavelength into the optical fiber of the one or more strain gages; and
(c) detecting light reflected from the one or more fiber Bragg gratings of the optical fiber of the one or more strain gages to detect changes in the wavelength of the one or more fiber Bragg gratings and thereby detect strain in the test specimen.

27. A method for measuring strain in a test specimen which comprises the steps of:
(a) attaching one or more strain gages to the test specimen by the method of claim 24;
(b) introducing light of appropriate wavelength into the optical fiber of the one or more strain gages; and
(c) detecting light reflected from the one or more fiber Bragg gratings of the optical fiber t of the one or more strain gages to detect changes in the wavelength of the one or more fiber Bragg gratings and thereby detect strain in the test specimen.

28. A gage carrier for a fiber optic strain gage consisting essentially of:
a body having a passageway extending along its length for receiving an optical fiber containing one or more fiber Bragg gratings, the passageway having a longitudinal axis, a central portion of the body intersecting at least a portion of the passageway forming a mold cavity for receiving a fiber bonding material, and a fiber guide formed along the longitudinal axis of the passageway for receiving the optical fiber, the mold cavity positioned in the body, with respect to the passageway and the fiber guide, and the optical fiber inserted into the passageway and the fiber guide, such that the optical fiber does not touch the sidewalls of the mold cavity and is positioned against the test specimen when the optical fiber is inserted in the passageway and the fiber guide and the gage carrier is positioned on the test specimen;
a filling hole passing from the outside surface of the carrier into the mold cavity for introduction of fiber bonding material into the mold cavity and one or more vent holes passing from the outside surface of the carrier into the mold cavity and spaced apart from said filling hole to allow air to escape the mold cavity as fiber bonding material is introduced into the mold cavity; and
a mounting surface for attaching the carrier to a test specimen,
wherein the mold cavity has a depth and width such that on injection of fiber bonding material to completely fill the mold cavity after insertion of the optical fiber into the passageway and fiber guide and positioning of the gage on the test specimen, the inserted fiber bonding material bonds the optical fiber to the test specimen.

\* \* \* \* \*